United States Patent

Dierwechter et al.

[11] Patent Number: 5,896,891
[45] Date of Patent: Apr. 27, 1999

[54] WRAP CAP

[76] Inventors: Dane M. Dierwechter; Jeanie Clemens, both of 220 North St., P.O. Box 425, Morgantown, Pa. 19543

[21] Appl. No.: 08/985,168

[22] Filed: Dec. 4, 1997

[51] Int. Cl.[6] .................................................. F16L 55/10
[52] U.S. Cl. ........................ 138/89; 138/109; 138/96 R; 285/15
[58] Field of Search ........................... 138/89, 109, 103, 138/96 R, 96 T, 156, 158; 285/15, 294, 407

[56] References Cited

U.S. PATENT DOCUMENTS

| | | | |
|---|---|---|---|
| 4,171,142 | 10/1979 | Harrison | 138/99 X |
| 4,209,029 | 6/1980 | Pennington | 138/99 X |
| 4,268,070 | 5/1981 | Adams | 138/99 X |
| 4,927,181 | 5/1990 | Ciotola | 138/99 X |
| 5,297,583 | 3/1994 | Bioret | 138/99 |
| 5,692,544 | 12/1997 | Freidrich et al. | 138/99 |

*Primary Examiner*—Patrick Brinson

[57] ABSTRACT

A pipe cap protective cover including at least one cover including a pair of U-shaped members having first ends hingably coupled together and second ends with a clip mechanism. Such clip mechanisms are adapted to be releasably coupled such that the U-shaped members define a central bore with a diameter similar to that of a pipe. Each U-shaped member further has a peripheral flange integrally coupled to an outer periphery thereof and extended perpendicularly with respect thereto. When the clip means are coupled, the U-shaped members and the flanges define a compartment with a circular open face and an interior space for protecting the flange and bolts of the pipe.

7 Claims, 2 Drawing Sheets

5,896,891

WRAP CAP

BACKGROUND OF THE INVENTION

1. Field of the Invention

The present invention relates to bolt covers and more particularly pertains to a new wrap cap for providing an alternative to using clay for protecting pipes and caps associated therewith.

2. Description of the Prior Art

The use of bolt covers is known in the prior art. More specifically, bolt covers heretofore devised and utilized are known to consist basically of familiar, expected and obvious structural configurations, notwithstanding the myriad of designs encompassed by the crowded prior art which have been developed for the fulfillment of countless objectives and requirements.

Known prior art bolt covers include U.S. Pat. No. 4,907,301; U.S. Pat. No. 4,582,462; U.S. Pat. No. 4,890,967; U.S. Pat. No. 4,659,273; and U.S. Pat. No. 5,082,409.

In these respects, the wrap cap according to the present invention substantially departs from the conventional concepts and designs of the prior art, and in so doing provides an apparatus primarily developed for the purpose of providing an alternative to using clay for protecting pipes and caps associated therewith.

SUMMARY OF THE INVENTION

In view of the foregoing disadvantages inherent in the known types of bolt covers now present in the prior art, the present invention provides a new wrap cap construction wherein the same can be utilized for providing an alternative to clay for protecting pipes and caps associated therewith.

The general purpose of the present invention, which will be described subsequently in greater detail, is to provide a new wrap cap apparatus and method which has many of the advantages of the bolt covers mentioned heretofore and many novel features that result in a new wrap cap which is not anticipated, rendered obvious, suggested, or even implied by any of the prior art bolt covers, either alone or in any combination thereof.

To attain this, the present invention generally comprises a pipe. Such pipe has an end with an annular flange integrally coupled thereto and extending outwardly therefrom. For reasons that will become apparent later, the annular flange has a plurality of bores formed therein. With reference still to FIG. 1, a pipe cap is shown having a disk-shaped configuration. A plurality of bores are formed in such cap. As such, the pipe cap is adapted to be situated over the end of the pipe in coaxial alignment with the annular flange. In such orientation, the bolts and nuts may be utilized to couple the pipe cap to the flange via the bores. When the flange of the pipe and pipe cap are coupled, a head of each bolt abuts the flange of the pipe and extends toward the pipe. Further, the nuts and an end of each bolt abut the pipe cap and extend away from the pipe cap. As shown in FIGS. 1 & 2, an inboard cover is provided. The inboard cover includes a pair of U-shaped members having first ends hingably coupled together and second ends with clip means. Such clip means are adapted to releasably couple the second ends of the U-shaped members. When the second ends are coupled, the inboard cover defines a central bore with a diameter similar to that of the pipe. Each U-shaped member further has a peripheral flange integrally coupled to an outer periphery thereof and extending perpendicularly with respect thereto. By this structure, when the clip means are coupled the U-shaped members and the flanges define a compartment with a circular open face and an interior space. For reasons that will be set forth hereinafter in greater detail, the inboard cover further has a plurality of ring shaped protrusions integrally coupled to the U-shaped members within the defined compartment. Associated therewith is an outboard cover including a circular face. A peripheral flange is integrally coupled to an outer periphery of the circular face and extends perpendicularly with respect thereto. The peripheral flange of the outboard cover thus defines a compartment with a circular open face and an interior space. The outboard cover further has a plurality of ring-shaped protrusions integrally coupled to the circular face of the outboard cover within the defined compartment, similar to the inboard cover. It should be noted, however, that the ring shaped protrusions of the outboard cover extend a distance greater than that of the ring shaped protrusions of the inboard cover. Finally, a coupling means is situated on diametrically opposite sides of the inboard cover and the outboard cover. In use, the inboard cover may be situated over the flange of the pipe with the heads residing in the ring shaped protrusions thereof. Also, the outboard cover may be situated over the pipe cap with the nuts and ends of the bolts residing in the ring shaped protrusions thereof. Thereafter, the coupling means are secured for coupling the inboard cover and outboard cover together in place.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new wrap cap apparatus and method which has many of the advantages of the bolt covers mentioned heretofore and many novel features that result in a new wrap cap which is not anticipated, rendered obvious, suggested, or even implied by any of the prior art bolt covers, either alone or in any combination thereof.

It is another object of the present invention to provide a new wrap cap which may be easily and efficiently manufactured and marketed.

It is a further object of the present invention to provide a new wrap cap which is of a durable and reliable construction.

An even further object of the present invention is to provide a new wrap cap which is susceptible of a low cost of manufacture with regard to both materials and labor, and which accordingly is then susceptible of low prices of sale to the consuming public, thereby making such wrap cap economically available to the buying public.

Still yet another object of the present invention is to provide a new wrap cap which provides in the apparatuses and methods of the prior art some of the advantages thereof, while simultaneously overcoming some of the disadvantages normally associated therewith.

Still another object of the present invention is to provide a new wrap cap for providing an alternative to using clay for protecting pipes and caps associated therewith.

Even still another object of the present invention is to provide a new wrap cap that includes a pair of U-shaped members having first ends hingably coupled together and second ends with a clip mechanism. Such clip mechanisms are adapted to be releasably coupled such that the U-shaped members define a central bore with a diameter similar to that of a pipe. Each U-shaped member further has a peripheral flange integrally coupled to an outer periphery thereof and extended perpendicularly with respect thereto. When the clip means are coupled, the U-shaped members and the flanges define a compartment with a circular open face and an interior space for protecting the flange and bolts of the pipe.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
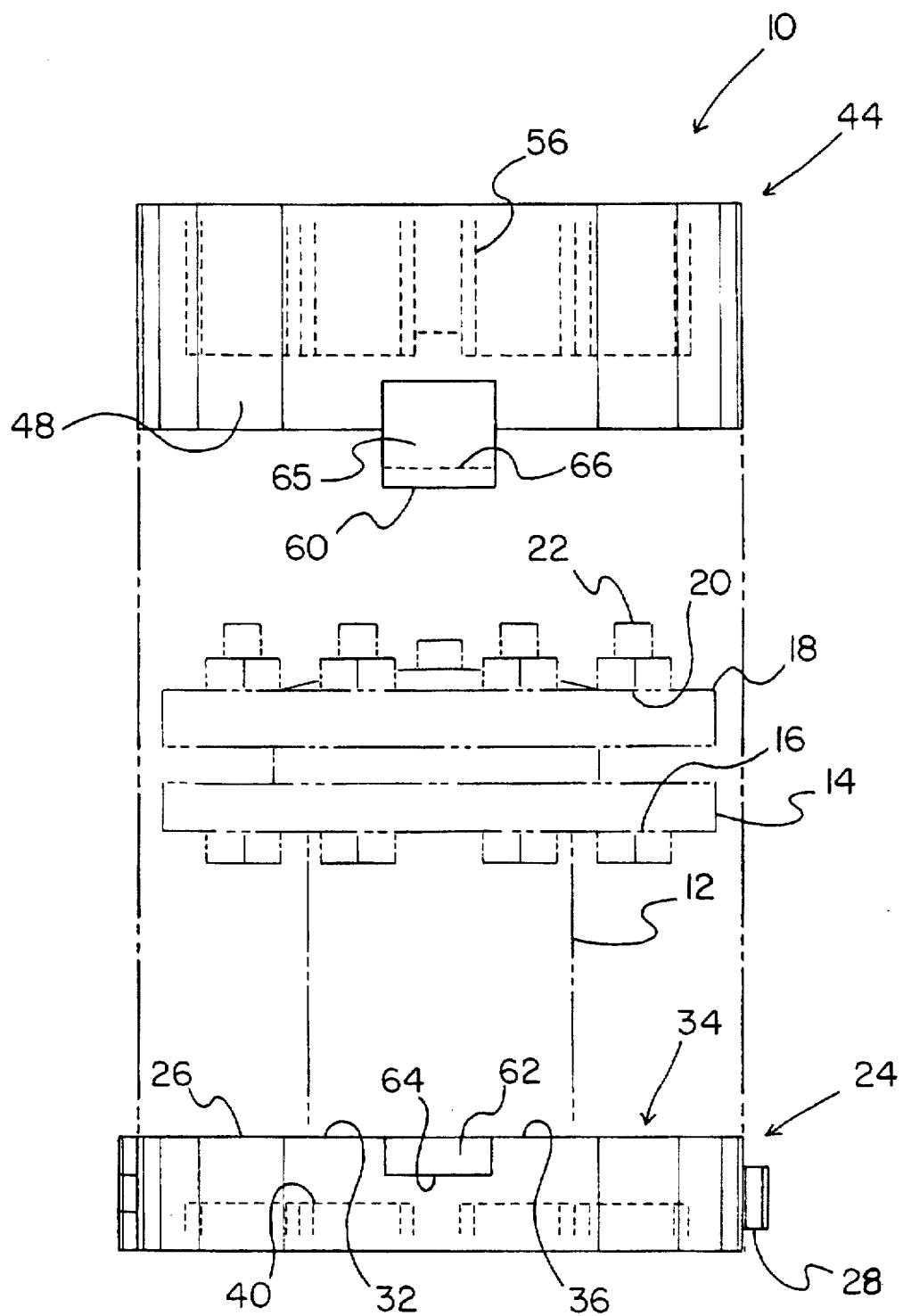
FIG. 1 is a side view of a new wrap cap according to the present invention in use.
Figure 2:
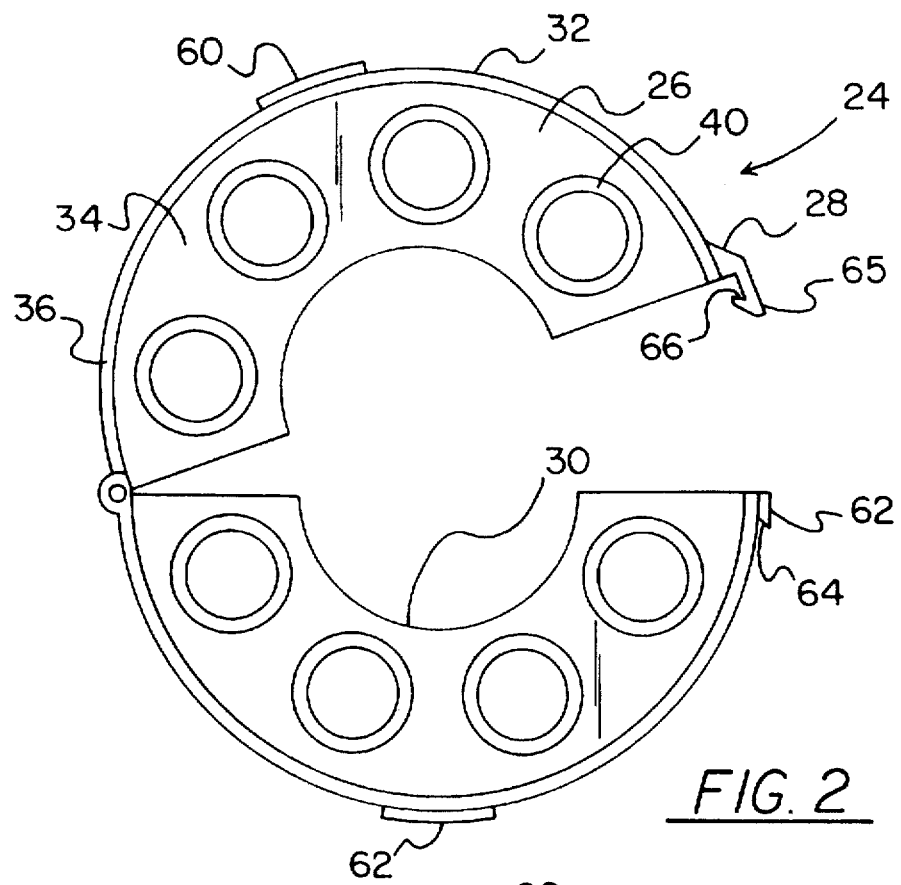
FIG. 2 is a top view of the inboard cover of the present invention.
Figure 3:
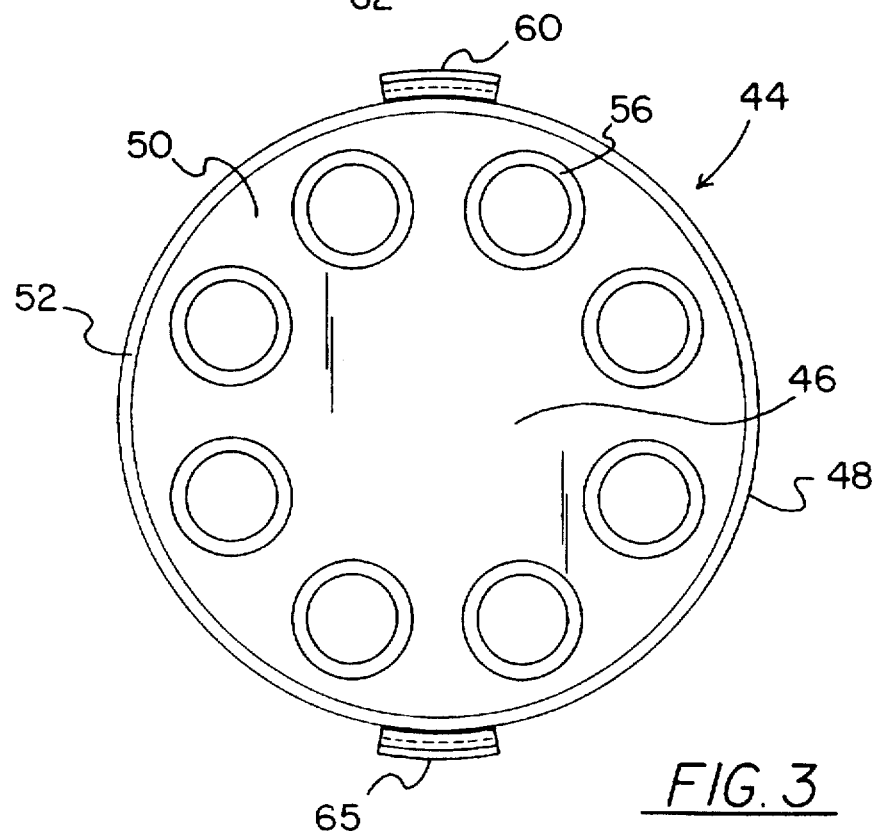
FIG. 3 is a top view of the outboard cover of the present invention.

With reference now to the drawings, and in particular to FIGS. 1 through 3 thereof, a new wrap cap embodying the principles and concepts of the present invention and generally designated by the reference numeral 10 will be described.

As shown in FIG. 1, the present invention is adapted for use in combination with a pipe 12. Such pipe has an end with an annular flange 14 integrally coupled thereto and extended outwardly therefrom. For reasons that will become apparent later, the annular flange has a plurality of bores 16 formed therein.

With reference still to FIG. 1, a pipe cap 18 is shown having a disk-shaped configuration. A plurality of bores 20 are formed in such cap. As such, the pipe cap is adapted to be situated over the end of the pipe in coaxial alignment with the annular flange. In such orientation, bolts and nuts 22 may be utilized to couple the pipe cap to the flange via the bores. When the flange of the pipe and pipe cap are coupled, a head of each bolt abuts the flange of the pipe and extends toward the pipe. Further, the nuts and an end of each bolt abut the pipe cap and extend away from the pipe cap.

As shown in FIGS. 1 & 2, an inboard cover 24 is provided. The inboard cover includes a pair of U-shaped planar members 26 having first ends hingably coupled together and second ends with clip means 28. Such clip means are adapted to releasably couple the second ends of the U-shaped members. When the second ends are coupled, the inboard cover defines a central bore 30 with a diameter similar to that of the pipe.

Each U-shaped member further has a peripheral flange 32 integrally coupled to an outer periphery thereof and extending perpendicularly with respect thereto. By this structure, when the clip means are coupled the U-shaped members and the flanges define a compartment 34 with a circular open face 36 and an interior space. For reasons that will be set forth hereinafter in greater detail, the inboard cover further has a plurality of ring shaped protrusions 40 integrally coupled to the U-shaped members within the defined compartment. In the preferred embodiment, the ring shaped protrusions extend a length less than ½ that of the peripheral flange. Note FIG. 1.

Associated therewith is an outboard cover 44 including a circular face 46. A peripheral flange 48 is integrally coupled to an outer periphery of the circular face and extends perpendicularly with respect thereto. The peripheral flange of the outboard cover thus defines a compartment 50 with a circular open face 52 and an interior space. It should be noted that an inner surface of the outboard cover can be concave or have any other shape corresponding to an outer surface of the pipe cap.

The outboard cover further has a plurality of ring-shaped protrusions 56 integrally coupled to the circular face of the outboard cover within the defined compartment, similar to the inboard cover. It should be noted, however, that the ring shaped protrusions of the outboard cover extend a distance greater than that of the ring shaped protrusions of the inboard cover. Further, the ring shaped protrusions of the outboard cover extend a length greater than ½ that of the peripheral flange 48 thereof. Note FIG. 1. As to the diameter of the inboard and outboard covers, it should be noted that such must be commensurate with the diameter of the subject pipe, flange and pipe cap.

Finally, a coupling means 60 is situated on diametrically opposite sides of the inboard cover and the outboard cover. In use, the inboard cover may be situated over the flange of the pipe with the heads of the bolts residing in the ring shaped protrusions thereof. Also, the outboard cover may be situated over the pipe cap with the nuts and ends of the bolts residing in the ring shaped protrusions thereof. Thereafter, the coupling means are secured for coupling the peripheral flanges of the inboard cover and outboard cover in abutment.

While not shown, an adhesive putty is applied at the interface of the bore of the inboard cover and the pipe, interface of the outboard and inboard cover, and the seconds ends of the U-shape members associated with the inboard cover.

In the preferred embodiment, each of the securement means and coupling means includes a tab 62 with a beveled engagement edge 64 and an arm 65 also with an engagement edge 66. By this structure, the beveled engagement edges may be releasably coupled and decoupled by simply biasing the arm 65.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A pipe cap protective cover comprising, in combination:

a pipe having an end with an annular flange integrally coupled thereto and extending outwardly therefrom, the annular flange having a plurality of bores formed therein;

a pipe cap having a disk-shaped configuration with a plurality of bores formed therein, whereby the pipe cap is adapted to be situated over the end of the pipe in coaxial alignment with the annular flange such that bolts and nuts may be utilized to couple the pipe cap to the flange via the bores, whereby a head of each bolt abuts the flange of the pipe and extends toward the pipe and the nuts and an end of each bolt abut the pipe cap and extend away from the pipe cap;

an inboard cover including a pair of U-shaped members having first ends hingably coupled together and second ends with clip means adapted to be releasably coupled such that the U-shaped members define a central bore with a diameter similar to that of the pipe, each U-shaped member further having a peripheral flange integrally coupled to an outer periphery thereof and extending perpendicularly with respect thereto, whereby when the clip means are coupled, the U-shaped members and the flanges define a compartment with a circular open face and an interior space, the inboard cover further having a plurality of ring shaped protrusions integrally coupled to the U-shaped members within the defined compartment;

an outboard cover including a circular face with a peripheral flange integrally coupled to an outer periphery thereof and extending perpendicularly with respect thereto, the peripheral flange of the outboard cover defining a compartment with a circular open face and an interior space, the outboard cover further having a plurality of ring-shaped protrusions integrally coupled to the circular face of the outboard cover within the defined compartment, wherein the ring shaped protrusions extend a distance greater than that of the ring shaped protrusions of the inboard cover; and coupling means situated on diametrically opposite sides of the inboard cover and the outboard cover, whereby the inboard cover may be situated over the flange of the pipe with the heads of the bolts residing in the ring shaped protrusions thereof and the outboard cover may be situated over the pipe cap with the nuts and ends of the bolts residing in the ring shaped protrusions thereof, the coupling means adapted for coupling the inboard cover and outboard cover together in place.

2. A pipe cap protective cover comprising:

a pipe having an end with an annular flange integrally coupled thereto and extending outwardly therefrom, the annular flange having a plurality of bores formed therein, wherein a plurality of bolts extends from such bores;

at least one cover including a pair of U-shaped members having first ends in communication with each other and second ends with clip means adapted to be releasably coupled such that the U-shaped members define a central bore, each U-shaped member further having a peripheral flange integrally coupled to an outer periphery thereof and extending perpendicularly with respect thereto, whereby when the clip means are coupled, the U-shaped members and the flanges define a compartment with a circular open face and an interior space for protecting the flange and bolts of the pipe;

wherein the cover further has a plurality of ring shaped protrusions integrally coupled to the U-shaped members within the defined compartment for covering and engaging the bolts.

3. A pipe cap protective cover as set forth in claim 2 and further including a second cover including a circular face with a peripheral flange integrally coupled to an outer periphery thereof and extending perpendicularly with respect thereto, the peripheral flange of the second cover defining a compartment with a circular open face and an interior space for engaging said pipe cap attached to the flange of the pipe.

4. A pipe cap protective cover as set forth in claim 3 wherein the second cover has a plurality of ring-shaped protrusions integrally formed within the respective defined compartments.

5. A pipe cap protective cover as set forth in claim 4 wherein the ring shaped protrusions of the second cover extend a distance greater than that of the ring shaped protrusions of the first cover.

6. A pipe cap protective cover as set forth in claim 3 and further including coupling means for coupling the first cover and second cover together in place.

7. A pipe cap protective cover comprising:

a pipe having an end with an annular flange integrally coupled thereto and extending outwardly therefrom, the annular flange having a plurality of bores formed therein for coupling with bores of a disk-shaped pipe cap via a plurality of bolts;

a cover including a circular face with a peripheral flange integrally coupled to an outer periphery thereof and extending perpendicularly with respect thereto, the peripheral flange of the cover defining a compartment with a circular open face and an interior space for engaging said pipe cap attached to the flange of the pipe, wherein the cover has a plurality of ring-shaped protrusions integrally coupled to the circular face of the cover for covering and engaging the bolts of the pipe.

* * * * *